United States Patent [19]

King et al.

[11] Patent Number: 5,544,856
[45] Date of Patent: Aug. 13, 1996

[54] REMOTELY CONTROLLING MODULATED FLOW TO A FUEL GAS BURNER AND VALVE THEREFOR

[75] Inventors: Todd L. King, Cedarburg; James E. Mading, Sussex; Earl T. Piber, Oconomowoc, all of Wis.

[73] Assignee: Eaton Corporation, Cleveland, Ohio

[21] Appl. No.: 274,319

[22] Filed: Jul. 13, 1994

[51] Int. Cl.$^6$ ............................. F16K 31/02; F16K 47/08
[52] U.S. Cl. ................ 251/129.08; 251/65; 251/122; 251/129.18; 251/129.22; 251/205
[58] Field of Search .......................... 251/65, 121, 122, 251/129.08, 129.15, 129.18, 129.22, 205

[56] References Cited

U.S. PATENT DOCUMENTS

| | | | |
|---|---|---|---|
| 2,007,051 | 7/1935 | Hirvonen | 251/122 |
| 2,014,314 | 9/1935 | Defenbaugh | 251/122 |
| 2,516,825 | 7/1950 | Hejduk et al. | 251/122 |
| 2,980,392 | 4/1961 | Greenwood | 251/205 X |
| 3,013,767 | 12/1961 | De Haven | 251/122 |
| 3,187,775 | 6/1965 | Pinnell | 251/122 X |
| 3,410,521 | 11/1968 | Sowers, III et al. | 251/205 |
| 4,530,374 | 7/1985 | Akagi et al. | 251/65 X |
| 5,076,537 | 12/1991 | Mears, Jr. | 251/65 |
| 5,094,218 | 3/1992 | Everingham et al. | 251/65 X |
| 5,265,842 | 11/1993 | Sorah et al. | 251/65 X |

*Primary Examiner*—John Rivell
*Attorney, Agent, or Firm*—Roger A. Johnston

[57] ABSTRACT

A method for remotely controlling flow of gaseous fuel to a burner having an electrically operated electromagnetically actuated modulating valve. The electromagnetic actuator comprises a coil having about one thousand turns of fine wire disposed proximate an annular permanent magnet. Either the magnet or coil may be attached to a moveable valve member which has a resilient poppet biased to close on a valve seat to shut off gas flow. Upon energization of the coil, a magnetomotive force is generated and moves the poppet off the seat to permit flow. Increased current flow in the coil proportionately increases opening of the poppet and movement of a metering member which throttles flow. When the poppet is fully open, flow is reduced to minimum metered level. A single user operated, remotely located potentiometer can be used to effect the proportional control of flow to the burner. In the preferred embodiment the metering member is cylindrical with a varying area grove or recess. In another embodiment, the metering member is a reversely conically tapered member throttling in a conically tapered metering passage.

24 Claims, 3 Drawing Sheets

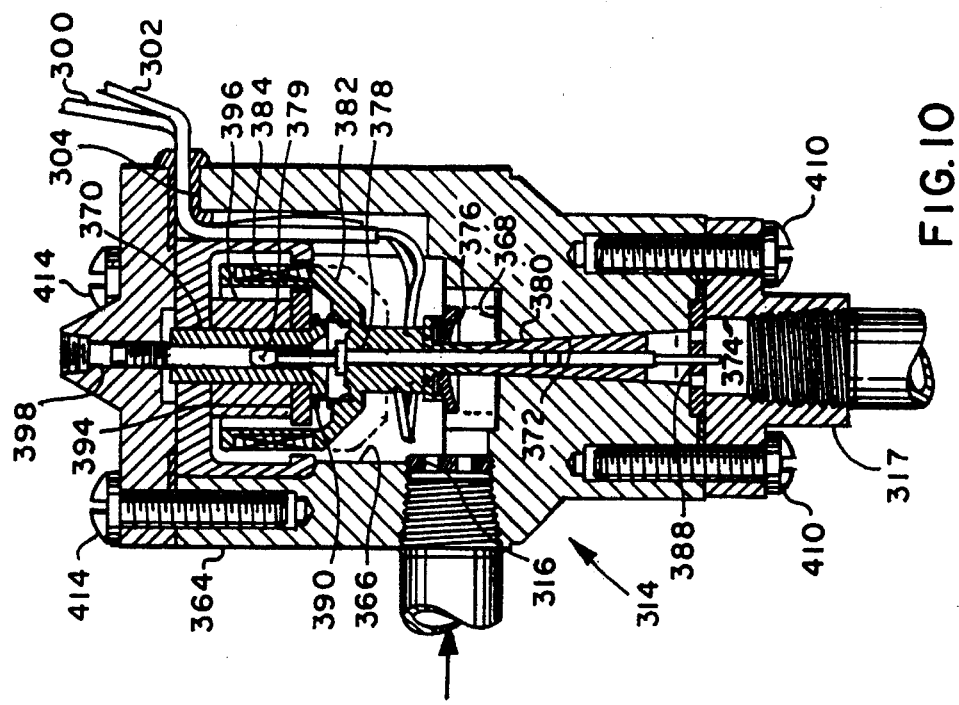

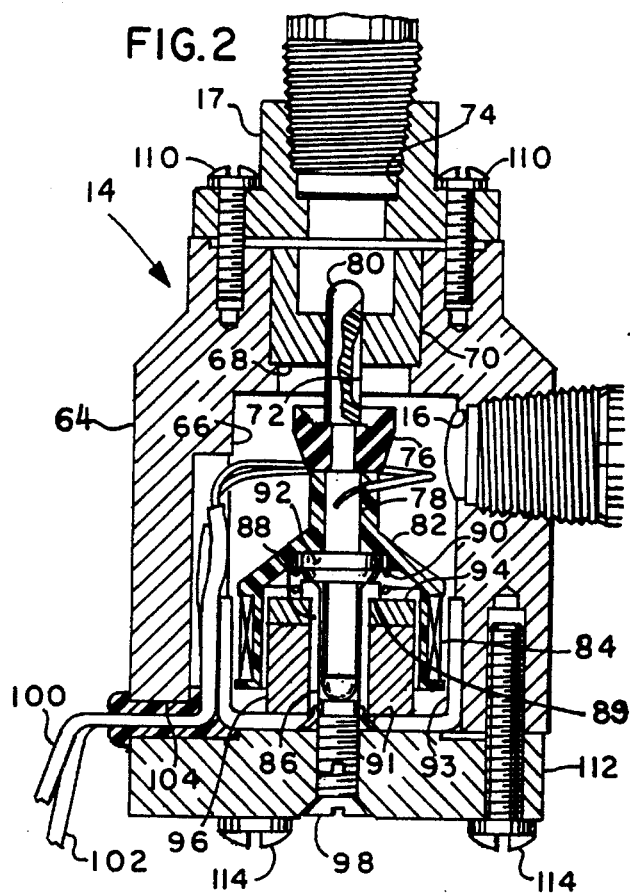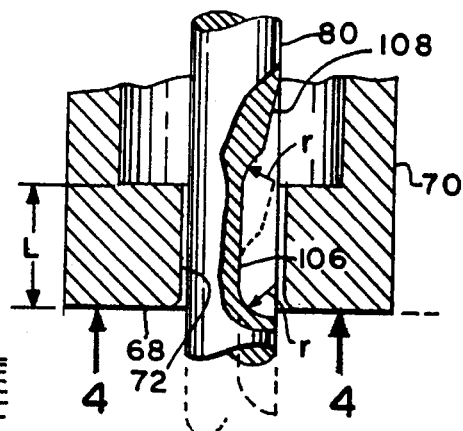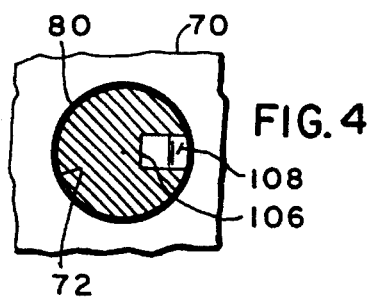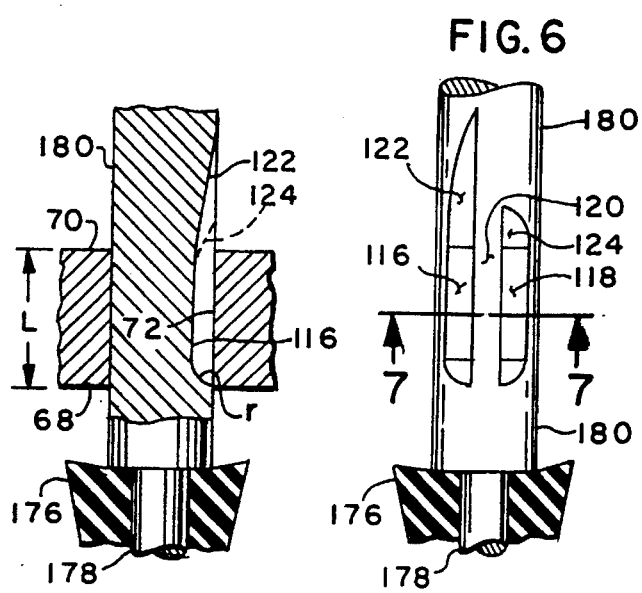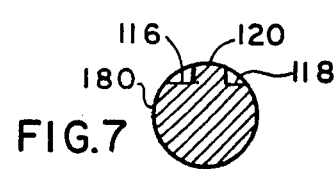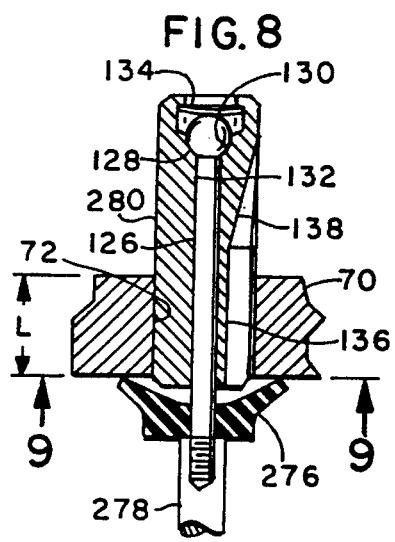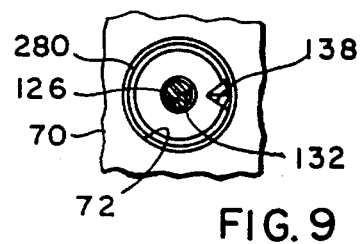

REMOTELY CONTROLLING MODULATED FLOW TO A FUEL GAS BURNER AND VALVE THEREFOR

BACKGROUND OF THE INVENTION

The present invention relates to the control of fuel gas flow to a burner and particularly to techniques for remotely varying the amount of fuel flow for maintaining the burner flame at a desired amount or level. The invention relates particularly to techniques for electrically remotely controlling the flow of gaseous fuel to a burner and more specifically to remote control of an electrically operated valve for modulating gas flow to the burner.

Heretofore, electrically operated valves employed for controlling flow fuel gas to a burner have been of the type having two states: either fully closed or fully open; and, the heat output of the burner is thus controlled by the percentage of the time during which the valve was fully opened. In fuel burners for furnaces and boilers utilized in heating buildings, typically the electrically operated burner valve is controlled by a thermostat which senses ambient temperature in the building and cycles the valve and burner ignition system accordingly.

It has been desired to provide for remote control of an electrically operated fuel gas valve in a cooking appliance in which heretofore the fuel gas valve has been either modulated manually by the user for surface burner control; or, an on/off electrically operated valve has been employed for the oven burner of the cooking appliance.

The competitiveness of the market for mass produced household cooking appliances requires that the cost of the burner and oven controls be minimized in order to facilitate manufacture and sale of the appliance. It has thus particularly been desired to provide a remotely controlled or modulating gas burner valve which enables such operation of a household range or oven in a manner which permits the range or oven to be sold competitively with cooking appliances which employ all-electric heating. Heretofore, all-electric appliances have provided on a cost competitive basis in the household cooking appliance market the ability to remotely or automatically control the level of heat by controlling the current flow in the electrical resistance heating elements in the top burner or oven easily and competitively by electrical or electronic means.

It has thus been long desired to provide a simple and reliable electrically operated modulating valve for a fuel gas burner which is reliable and sufficiently low in manufacturing costs to enable the burner control system to compete in the marketplace with all-electric heating element control systems.

SUMMARY OF THE INVENTION

It is an object of the present invention to provide remote control of an electrically operated valve for modulating fuel gas flow to a burner.

It is another object of the invention to provide remote control of an electrically operated gas burner valve having a poppet for closing the valve and openable by an electromagnetic actuator and a metering member moveable with the poppet for providing metering or modulating of the gas flow with the poppet in the open position.

It is another object of the invention to remotely control an electrically operated gas burner valve having a poppet for closing the valve and opening the poppet with an electromagnetic actuator having a coil and permanent magnet for providing movement of the poppet to current flow in the coil for opening the valve and thereafter providing modulated flow.

The remotely controlled electrically operated modulating burner control system of the present invention employs an electromagnetically operated valve which has a poppet with a metering member attached thereto for modulating or metering gas proportional to current flow in the electromagnet actuator flow when the poppet is in the open position. The metering member is configured such that initial opening of the poppet from the valve seat provides maximum flow and continued movement of the poppet reduces the flow proportional the current to a minimum metered amount when the poppet is in the fully open position. The electromagnetic actuator employs an electrical coil proximate an annular permanent magnet with one of the coil and magnet attached to the poppet for movement therewith and the other of the coil and magnet mounted on the body of the valve. In the preferred practice, the coil is moveable with the poppet and metering member; and, the permanent magnet is mounted to the valve body. In one embodiment the metering member comprises a cylindrical spool having a groove or recess therein; and, in another embodiment the metering member comprises a conically tapered member disposed in a conically tapered metering passage. The burner control system of the present invention employs an electrically operated electromagnetically actuated poppet valve having a metering member attached thereto for modulating or metering gas flow when the valve is in the open position generally corresponding to the level of energization of the electromagnetic actuator. The burner control system of the present invention employs an electrically operated electromagnetically actuated shut-off and metering valve for modulating fuel gas flow to a burner and which is easily controlled by a simple user input such as a variable voltage from a potentiometer to provide flow proportional to the potentiometer setting. The present invention is easy to manufacture and assemble and is low in cost thereby providing application to the highly competitive household cooking appliance market.

BRIEF DESCRIPTION OF THE DRAWINGS

FIG. 1 is a schematic of a burner control system as applied to a top burner for a household cooking appliance;

FIG. 2 is a cross-section of the preferred valve of the system of FIG. 1;

FIG. 3 is an enlarged view of a portion of the valve of FIG. 2;

FIG. 4 is a portion of a section view taken along section indicating lines 4—4 of FIG. 3;

FIG. 5 is a portion of a cross-section of an alternate embodiment of the valve of FIG. 2;

FIG. 6 is a right hand side view of the embodiment of FIG. 5;

FIG. 7 is a section view taken along section indicating lines 7—7 of FIG. 6;

FIG. 8 is a view similar to FIG. 5 of another embodiment of the valve of FIG. 2;

FIG. 9 is a section view taken along section indicating lines 9—9 of FIG. 8;

FIG. 10 is a view similar to FIG. 2 of another embodiment of the valve of FIG. 1;

DETAILED DESCRIPTION

Figure 11:
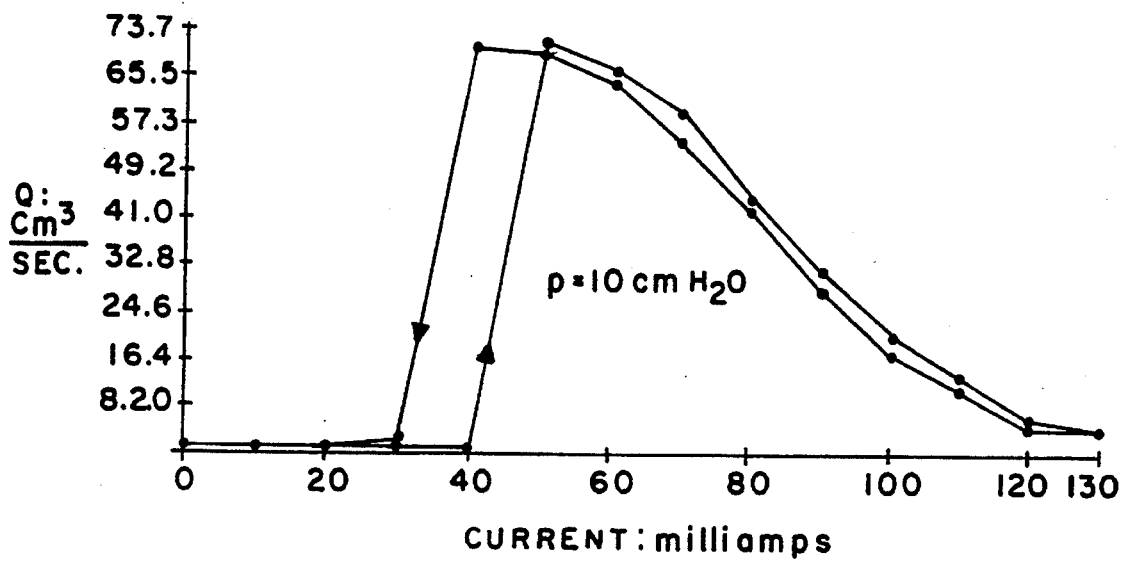
FIG. 11 is a plot of values of flow rate as a function of coil current for the valve of FIG. 2; and, FIG. 12 is a plot of flow rate as a function of metering valve position for the valve of FIG. 10.

Referring to FIG. 1, a burner control system is indicated generally at 10 and includes a fuel line or conduit 12 adapted for attachment to a source of gaseous fuel and which is connected to the inlet 16 of an electrically operated modulating valve indicated generally at 14. Valve 14 has an outlet 17 connected to a burner tube or conduit 18 which supplies fuel gas to the aspirator inlet 20 of a burner 22.

The electrically operated valve 14 is connected to the electrical leads 24,26 to an electrical or electronic controller 28 which receives power from power line leads 30,32. The controller receives a control input through leads 34,36 connected to a user input control 38 which may comprise a potentiometer or variable resistance which is operated by user rotation of knob 40 provided on the control console or panel 42 which may be remotely located from the burner 22.

An electrical ignitor typically a spark ignitor 44 is disposed adjacent the burner and is connected by leads 46,48 to a spark or ignitor control circuit device 50 which may be located at a convenient location such as proximate the ignitor 44, and is connected to the controller 28 by leads 52,54. It will be understood that alternatively the ignitor control circuit 50, which is well known in the art, may also be included with the controller 28. A flame sensor 56 is disposed adjacent the burner and provides a signal along leads 58,60 to the controller 28 for enabling the controller to prevent opening of the valve 14 if ignition has not occurred, or to close the valve in the event the flame has gone out with the valve in the open condition.

It will be understood that the ignitor 44, ignitor control circuit 50, valve 14 and flame sensor 56 may be located remote from the control panel 42 in a common housing structure with burner 22 as indicated in dashed outline by reference numeral 62.

Referring to FIG. 2, the preferred form of the valve 14 in the present invention is shown as having a valve body or housing 64 which has a valving cavity 66 therein which communicates with a valve seating surface 68 which may be formed on a separate insert member 70 and which seating surface surrounds an outlet metering passage 72 which communicates with passage 74 provided in outlet 17. A resilient preferably elastomeric poppet 76 is disposed closed against the seating surface 68. Poppet 76 is attached to a valve member 78 which has a metering portion or rod 80 formed thereon which extends into and closely interfits in sliding engagement the metering passage 72. The valve inlet passage 16 communicates with the valving chamber 66 such that upon downward movement of the poppet 76 and valve member 78 gas flows through the annular space between metering rod 80 and passage 72 and outwardly through outlet passage 74.

Moveable valve member 78 has a bobbin member 82 attached thereto upon which is wound coil 84 which moves with the valve member 78. The remote end 86 of valve member 78 is piloted in a bushing 88 having a flanged end 89 against which one end of a spring 90 is registered with the opposite end of spring 90 registering against a flange 92 provided on the valve member. The flanged end 89 of bushing 88 has the underside thereof registered on a ferromagnetic pole piece configured as annular disc 94 which is registered against the end of annular permanent magnet 96 which is disposed concentrically and preferably within coil 84. Bushing 88 extends through annular magnet 96 through an aperture 91 formed in a ferromagnetic cupshaped pole member 93. The lower end of bushing 88 is flared outwardly to retain the magnet and disc 94 on the cup-shaped member as a subassembly.

In the presently preferred practice of the invention the electromagnetic actuator has the coil mounted on the moving armature. The stationary portion of the magnetic circuit comprises the permanent magnet 96, the cup-shaped steel pole piece member 93, and steel annular disc 94. The circuit is completed radially across the moving coil 84 from disc 94 to the cup-shaped pole piece 93. The annular disc 94 serves to concentrate flux from magnet 96 radially across the coil 84 to produce an axially directed force on the armature when current flows in coil 84; and, this axial force overcomes the force of spring 90 to move the armature and valve member in a downward direction in FIG. 2. It will be understood that the axial force on the armature is proportional to the number of ampere-turns of current in the coil. Thus, if the return of spring 90 has a linear force versus deflection relationship, the downward movement or displacement of the armature will be proportional to the ampere-turns of current in the coil. The arrangement of the magnetic circuit of the invention wherein magnetic flux is concentrated at the outer cylindrical surface of disc 94 functions to maintain the magnitude of the axial force, per ampere-turn substantially constant for a given current flow as the armature is moved with respect to the disc 94.

In the presently preferred practice, the outlet fitting 17 is retained over the insert 70 by suitable fasteners such as screws 110. Similarly the lower end of the body of the valve and chamber 66 is closed by the cap member 112 which is retained by fasteners such as screws 114. A cover screw 98 is provided through cap 112 to provide a cover over an adjustment screw which serves as an adjustable limit stop for downward movement of the valve member with respect to FIG. 2. Leads 100,102 are attached to the coil 84 and pass through an opening 104 provided in the valve body 64.

The arrangement of the valve of FIG. 2 thus provides a lightweight moveable armature in the form of the valve member 78, bobbin 82 and coil 84.

Referring to FIGS. 3 and 4, the metering rod 80 is shown as having a groove or recess 106 therein which, preferably as shown in FIG. 4 has a constant width. The lower edge end of the groove is preferably formed at a radius "r" as is the upper edge end which intersects a ramped or tapered end portion denoted by reference numeral 108. The configuration of the groove shown in FIGS. 3 and 4 provides, upon opening of the poppet and in downward movement of the rod 80 to the fully open position, as shown in dashed outline an initially maximum flow as gas flows through the deeper portion 106 of the groove. As the rod 80 continues to move downward causing tapered portion 108 to move into the metering passage 72, flow through groove 106 is reduced; and, flow is through the portion of the groove denoted by reference numeral 108. As the ungrooved portion of rod 80 enters passage 72, flow is diminished to a minimal amount determined by the annular clearance between rod 80 and passage 72 which is sufficient to maintain the burner flame at a low level.

In the presently preferred practice of the invention, the coil is designed to operate on very low current in the range 20 to 140 milliamps at 24 volts DC and has 800 to 1200, preferably 1000, turns of fine wire of number 37 to number 39 AWG. A metering rod having a diameter of about 3.6 millimeter has a groove width of 1.78 millimeters and provides a maximum flow of 43 cubic centimeters per sec ($cm^3$/sec) at a supply pressure of 25 centimeters of water column (25 $cmH_2O$).

Figure 12:
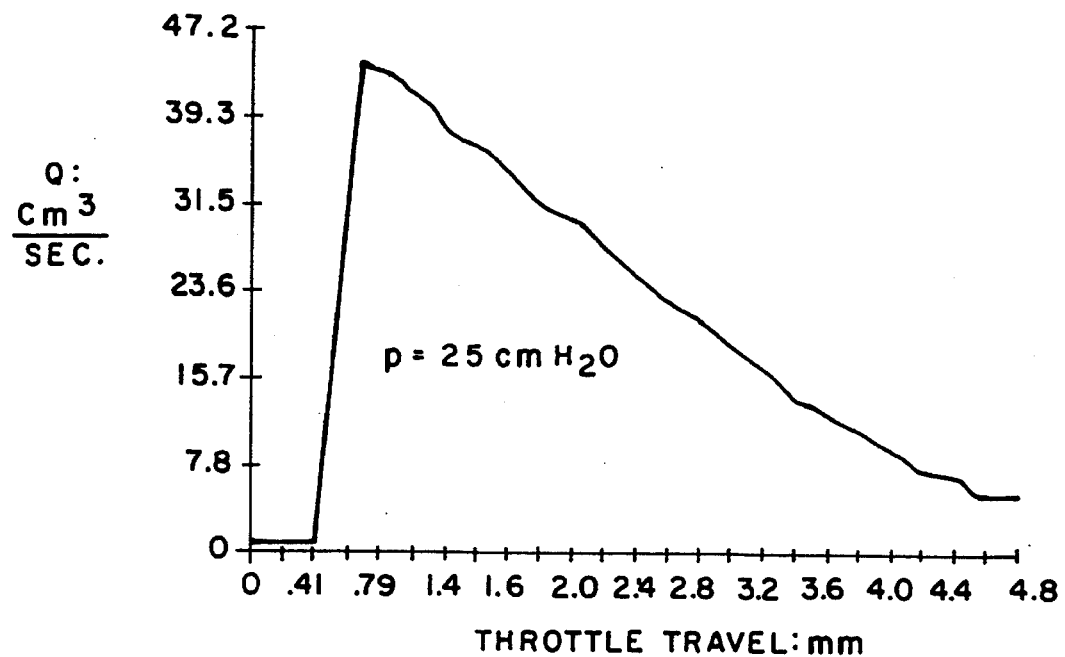

Referring to FIG. 12, the maximum flow for the valve of FIG. 2 is shown to occur at a position of movement of the poppet of about 0.58 millimeters from the poppet closed position; and, the flow decreases substantially linearly with movement referred to as throttle travel in FIG. 12 of the metering rod 80 to a fully open position of 4.4 millimeters from the poppet closed position where the flow has decreased to its minimum level. It will be seen from FIG. 12 that the electromagnetic actuator comprising coil 84 and annular permanent magnet 96 provide a flow which is substantially proportional to the movement of the valve member metering rod 80. Thus, a simple controller such as a potentiometer may be employed for the user input control 38 to position the valve member at any proportional position of its full travel limit by dialing a corresponding percentage of full rotation of the user control knob 40.

In the presently preferred practice of the invention, the dimension denoted by the reference character "L" in FIG. 3 denotes the length of the metering passage 72 which in the present practice of the invention is about 5.1 millimeters. The radius "r" at the ends of groove 106 is formed by a 6.35 millimeter diameter rotary cutter which gives a radius of 3.175 millimeters. It will be understood that the groove 106 has its length determined by the dimension "L", inasmuch as the end of the tapered surface 108 must enter the metering passage 72 before the lower end of the valve member 78 hits the upper end of the limit stop screw 98.

Referring to FIGS. 5, 6, and 7, another embodiment of the valve member is indicated at 178 as having a pair of spaced generally parallel recesses 116, 118 formed on the valve member 178 on opposite sides of a central land 120. The groove 116 and the groove 118 each have the leading or lower ends thereof configured to a radius "r"; however, the trailing or upper ends of groove 116 is tapered, denoted by references numeral 122, at a lesser slope than the tapered portion 124 of the land 118.

Referring to FIGS. 8 and 9, another embodiment of the metering valve member is illustrated at 278 as a separate fitting retained on the valve member 278 by a central bolt 126 which has a ball 128 formed on the upper end thereof and which is pivoted in a socket 130 formed in the end of metering member 280. The bolt 126 has a diameter slightly less than the central passage 132 formed in the metering member to accommodate misalignment of the metering member 280 with respect to the metering passage 72. The metering member 280 is retained by a Belleville washer 134 having its outer periphery engaging an undercut in the metering member.

Referring to FIGS. 8 and 9, a metering groove 136 is formed in the metering member 280 and has a triangular or V-shaped cross-section as shown in FIG. 9. The groove 136 has a constant area cross-section lower portion with a trailing or upper portion ramped as denoted by reference numeral 138. It will be understood that the bolt 126 passes through the poppet 276 to engage the valve member 278. It will be understood with reference to FIG. 8 that the lower or leading edge of groove 136 extends to the lower end of the metering member 280 which is spaced from the sealing surface of the poppet to prevent the poppet from closing off the end of the groove when the poppet is in the open position.

Referring to FIG. 10, another embodiment of the valve is indicated generally at 314 with an inlet passage 316 and in outlet fitting 317 provided in the valve body 364. Body 364 defines a valving chamber 366 defining a valve seating surface 368 having formed therein a conically tapered metering passage 372 which communicates with an outlet passage 374 in fitting 317. A resilient poppet 376 is disposed for closing against surface 368 as shown in dashed outline in FIG. 10; and, the poppet is attached to a valve member 378 for movement therewith. The valve member has attached thereto a conically reverse tapered metering member 380 which has its taper corresponding to the taper of passage 372. The valve member 378 is piloted in the center of a perforated washer 388 provided in the outlet passage 374. The upper end of the valve member is piloted in a bushing insert 370. An annular permanent magnet 396 is disposed concentrically about bushing 370. A bobbin 382 which is attached to the valve member 378 and has a coil 384 wound thereon which moves with the valve member 378. Coil 384 is generally disposed concentrically about permanent magnet 396. Coil leads 300,302 extend outwardly through a passage 304 formed in the valve body. The upper end of the valve which comprises a cap 412 which is retained by screws 414. In similar manner the outlet fitting 317 is retained on the valve body by screws 410. An adjustment screw 398 extends through cap 412 and serves as a stop for the upper limit of movement of valve member 378.

The valve member 378 has a spherical lobe 379 formed thereon which slidingly engages the central bore of insert 370 to accommodate misalignment of the valve member with respect to the fitting 370. It will be understood that the spherical surface 379 is thus piloted in the insert 370. The valve member is biased downwardly with respect to FIG. 10, or towards the poppet-closed position, by a spring 390 which has its upper end registered against a ferromagnetic pole piece shaped as an annular disc 394 registered against the axial face of the magnet 396; and, the lower end of spring 390 is registered against the bobbin 382.

In the presently preferred practice, the reverse tapered metering member 380 of the embodiment of FIG. 10 has a taper angle of approximately six degrees measured with respect to the central axis. In one configuration the passage 372 has a minimum diameter at its upper end of about 3.7 millimeters and its largest diameter at the lower end of about 8.1 millimeter. In the presently preferred practice of the embodiment of FIG. 10, the tapered metering member 380 has a clearance of about 0.013 millimeters when the upper end of the rod 378 hits the end of screw 398 to limit the upward travel thereof.

Referring to FIG. 12, the values of flow in centimeters cubed per second are given for a valve tested in the configuration of FIG. 10 and having the dimensions mentioned above. The values of flow Q are plotted as a function of the movement in millimeters of the valve member 378 (throttle travel) for a supply pressure of 25 centimeters of $H_2O$ column. It will be seen from the graph of FIG. 12 that the poppet is fully opened at about 0.6 millimeters of travel; and, flow decreases linearly with throttle travel to a maximum travel of 4.8 millimeters. The embodiment of FIG. 10 is intended as employing a coil and magnet similar to the embodiment of FIG. 2.

The present invention thus provides a unique and relatively low-cost technique for providing remote control of an electrically operated modulating gas valve for controlling flow of gaseous fuel to a burner. The electrically operated valve of the present invention employs an electromagnetic actuator which has a preferably moveable coil and stationary permanent magnet; and, for a given current flow in the coil produces a substantially constant actuating force irrespective of the position of the actuator. This feature is a result of applying a fine wire coil having about one thousand turns disposed proximate an annular permanent magnet. The coil is preferably attached to the moveable valve member which has a poppet for closing against the valve seat to shut off gas flow; and, upon opening of the poppet a metering member attached to the valve member throttles gas flow proportionally with increasing current flow in the coil and movement of the valve member. The electromagnetic actuator produces flow metering which is substantially linear with respect to current flow in the coil and thus renders the valve capable of proportionately modulating gas flow in response to a user input from a simple potentiometer type controller.

Although the invention is capable of modification and variation by those having ordinary skill in the art, the invention is intended as limited only by the following claims.

I claim:

1. A modulating gas valve assembly comprising:
   (a) housing means defining therein an inlet, outlet and a flow metering bore communicating with said outlet having a valve seat formed therearound at one end thereof, said bore communicating with a valving chamber;
   (b) a metering valve closely interfitting said metering bore in sliding arrangement including a poppet attached thereto and operable in a closed position for seating against said valve seat for preventing flow through said bore and operable in an open position to permit such flow;
   (c) a metering groove formed in said valve member, and having for a predetermined distance from said poppet, a generally constant area in the direction of movement of said valve member, with the area thereof decreasing at a first predetermined rate beyond said distance; and an area decreasing in area at a second lesser rate therebeyond;
   (d) a coil of electrically conductive material attached to said metering valve means and moveable therewith and including end leads adapted for electrical connection thereto;
   (e) means defining a magnetic circuit attached to said housing means and disposed generally concentrically with respect to said coil; and,
   (f) guide means piloting the end of said metering valve remote from said poppet wherein said coil is operable upon electrical energization to electromagnetically effect movement of said poppet and metering valve member a distance substantially proportional to the level of energization.

2. The valve assembly defined in claim 1, wherein said groove has a substantially constant width the full length thereof.

3. The valve assembly defined in claim 2, wherein said guide means includes adjustable stop means for limiting the movement of said valve member in the opening direction.

4. The valve assembly defined in claim 2, wherein said housing means a first member defining said valving chamber and a second member disposed at one end of said chamber and defining said valve seat and a third member disposed distal said second member and defining said guide means.

5. The valve assembly defined in claim 1, wherein said means defining a magnetic circuit includes a magnet is disposed concentrically within said coil.

6. The valve assembly defined in claim 1, wherein said poppet comprises a member formed of resiliently deformable material.

7. The valve assembly defined in claim 1, wherein said poppet is formed of elastomeric material.

8. The valve assembly defined in claim 1, wherein said housing means comprises a first member having a bore therethrough forming said valving chamber, with a second member forming said valve seat assembled in one end of said bore with said metering valve and a third member assembled in the opposite end of said bore.

9. A method of modulating fuel flow to a fuel gas burner comprising:
   (a) providing a valve body with an inlet and outlet and connecting the inlet to a source of fuel gas, and the outlet to a fuel burner;
   (b) forming a metering orifice in said outlet and a valve seating surface therearound;
   (c) disposing a metering spool in said orifice and securing a poppet thereto and closing said poppet on said valve seat;
   (d) providing a coil and disposing a permanent magnet spaced adjacent thereto and attaching one of said coil and magnet to said poppet and spool; and,
   (e) forming in said spool a groove having a first portion having the transverse area varying at a first rate and a second portion having the transverse area varying at a lesser rate and electromagnetically moving said popper and spool progressively from a position of maximum mass flow, then to a position of flow through said first portion, then to a position of flow through said second portion.

10. The method defined in claim 9, wherein said step of moving progressively includes moving said valve spool in one direction.

11. The method defined in claim 9, wherein said step of forming includes forming a groove in said spool and maintaining the width of the groove constant and varying the depth of the groove along the length thereof.

12. The method defined in claim 9, wherein said step of progressive metering includes forming a constant width groove in the spool and maintaining the depth of the groove constant for an initial distance and progressively decreasing the depth of the groove at a first rate for a second distance, and progressively decreasing the groove depth at a second rate for a third distance.

13. A method of controlling fuel gas flow to a burner comprising:
   (a) connecting a fuel valve between a fuel gas source and said burner;
   (b) forming a valve seating surface surrounding a metering passage in said fuel valve;
   (c) disposing a moveable metering member in said passage and attaching a poppet thereto and disposing said poppet for contacting said seating surface;
   (d) providing a coil of electrically conductive material and positioning a permanent magnet adjacent said coil and attaching one of said coil and magnet to said poppet for movement therewith;
   (e) forming on said metering member a first portion defining in cooperation with said metering passage a flow channel varying in transverse area at a first rate and forming on said metering member a second portion defining in cooperation with said metering passage a flow channel varying in transverse area at a second lesser rate; and,
   (f) flowing a controlled current through said coil and electromagnetically (i) moving said poppet away from said seating surface for maximum flow and (ii) positioning said metering member for controlling flow through said first and second portions of said metering member proportionate to said current.

14. The method defined in claim 13, wherein said step of providing a coil includes surrounding a stationary permanent magnet with said coil.

15. The method defined in claim 13, wherein said step of disposing a metering member includes providing a cylindrical member and forming a variable area groove therein.

16. An electrically operated modulating valve assembly comprising:
   (a) housing means defining therein an inlet, outlet and a flow metering passage communicating between said outlet and a valve seating surface, said passage communicating with a valving chamber;
   (b) a valve member disposed in said chamber and moveable between a closed position sealing against said valve seating surface and an fully open position spaced from said seating surface, said valve member including a metering portion extending into said metering passage and cooperating with said passage to proportionately meter flow therethrough at a first varying rate and then at a second lesser varying rate when said valve member is moved between said closed position and said fully open position;
   (c) a coil of electrically conductive material including end leads adapted for electrical connection thereto;
   (d) means defining a magnetic circuit disposed proximate said coil with one of said coil and said magnetic circuit means attached to said valve member and the other associated with said housing means, wherein said coil is operable upon electrical energization to electromagnetically effect movement of said valve member by an amount corresponding to the level of energization to a position for a desired flow.

17. The valve assembly defined in claim 16, wherein said metering member has a generally conically tapered configuration.

18. The valve assembly defined in claim 16, wherein said metering member has a generally cylindrical configuration with a variable area recess or groove formed therein.

19. The valve assembly defined in claim 16, wherein said permanent magnet is mounted to said housing means and has an annular configuration and said coil is attached to said valve member.

20. The valve assembly defined in claim 16, wherein said permanent magnet has an annular configuration and is disposed on said housing means generally concentrically within said coil.

21. The valve assembly defined in claim 16, wherein said valve member includes an elastomeric poppet for contacting said seating surface.

22. The valve assembly defined in claim 16, wherein said metering passage serves as a bearing surface for slidably supporting one end of said valve member.

23. The valve assembly defined in claim 16, wherein said valve member has one end piloted on said housing means and the opposite end is piloted on said metering passage.

24. The valve assembly defined in claim 16, wherein said metering portion and said metering passage co-operate to provide maximum flow upon opening of said valve member and proportionately decrease flow with increasing opening of said valve member.

* * * * *